P. T. SANFORD.
SEED TAPE PLANTER.
APPLICATION FILED MAY 3, 1918.
1,292,082.
Patented Jan. 21, 1919.
2 SHEETS—SHEET 1.
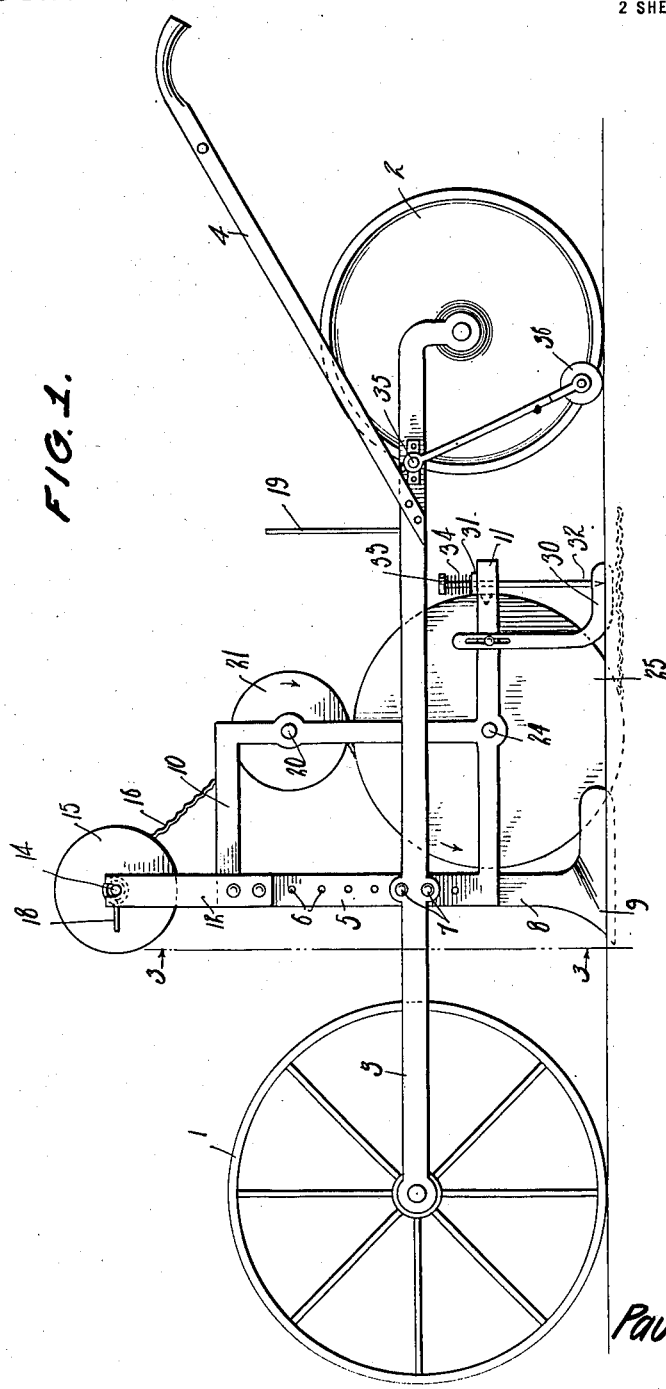
INVENTOR
Paul T. Sanford
WITNESSES
BY
ATTORNEY

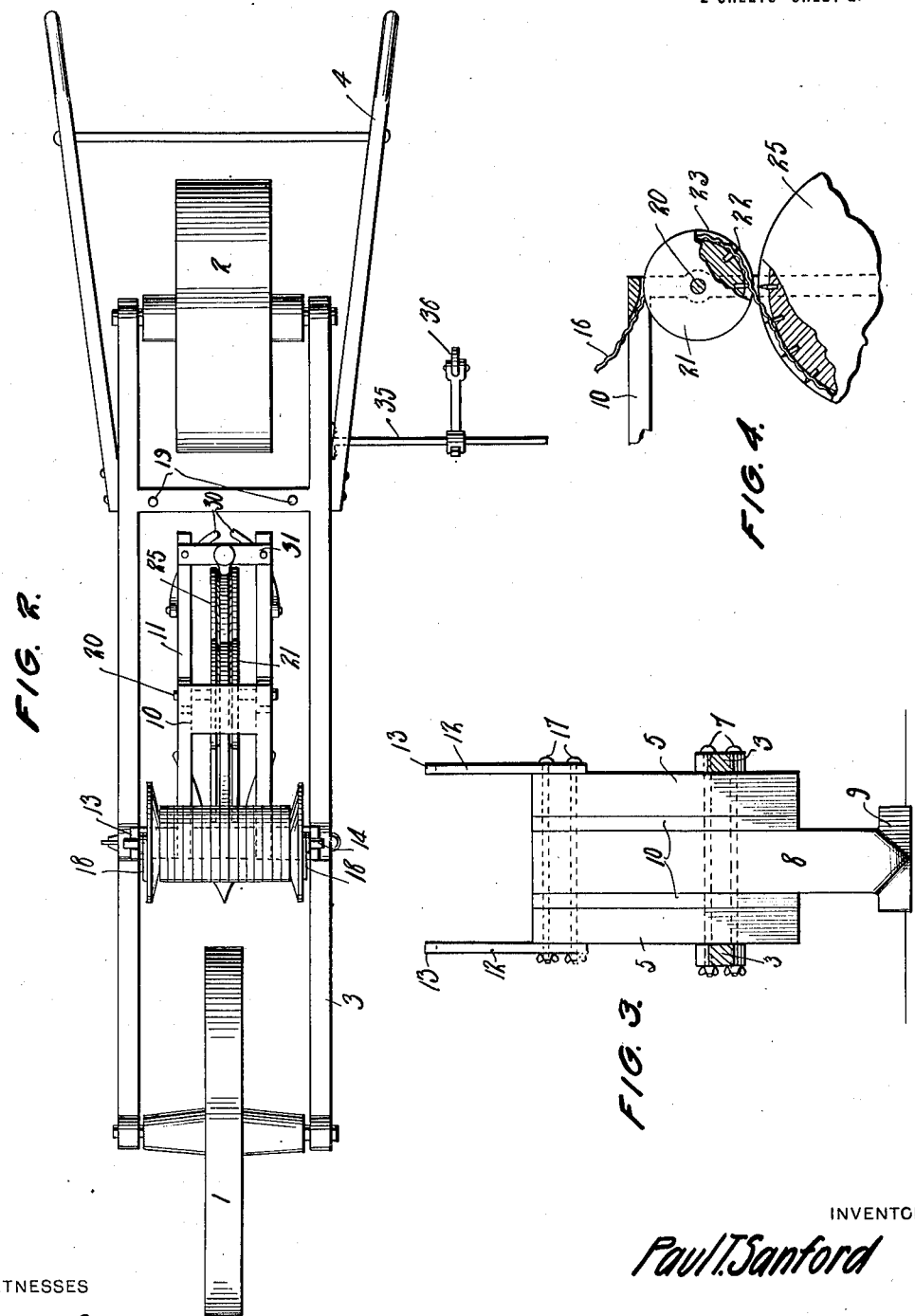

UNITED STATES PATENT OFFICE.

PAUL T. SANFORD, OF BEMIDJI, MINNESOTA.

SEED-TAPE PLANTER.

1,292,082.   Specification of Letters Patent.   Patented Jan. 21, 1919.

Application filed May 3, 1918. Serial No. 232,259.

*To all whom it may concern:*

Be it known that I, PAUL T. SANFORD, a citizen of the United States, residing at Bemidji, in the county of Beltrami and State of Minnesota, have invented certain new and useful Improvements in Seed-Tape Planters, of which the following is a specification.

This invention relates to seeders and planters, and more especially to those adapted to plant seeds in checked rows; and the primary object of the invention is to produce a hand machine by which a seed tape may be manipulated.

A secondary object may be said to consist of the details of construction whereby this machine is adapted to this particular use.

Attention is invited to the following specification and claims, and to the drawings herewith and in which:—

Figure 1 is a side elevation of this machine complete,

Fig. 2 a plan view thereof,

Fig. 3 a vertical section on the line 3—3 of Fig. 1, and

Fig. 4 a fragmentary detail showing the course of the tape over the idler and onto the drill wheel.

Front and rear wheels 1 and 2 support a main frame consisting of side beams 3 having handles 4 at their rear ends and upright blocks 5 at their mid-length pierced with a series of holes 6. Through certain of the latter pass bolts 7 which pass through a standard 8 interposed between the blocks and having at its lower end a furrow opener 9. Said bolts 7 and others numbered 17 also clamp two frames 10 between the blocks 5 and the standard 8, and the lower sides of these frames have rearward extensions 11 for a purpose yet to appear. Clamped to the blocks by the upper bolts 17 are upstanding fingers 12 having bearings 13 in their upper ends in which is adapted to be laid a rod 14 which passes through a spool 15 on which is wound the well-known seed tape 16, and tension springs 18 project from said fingers 12 and bear against the ends of the spool to retard its rotation on said rod. Pins 19 rising from the main framework may carry other spools not shown.

Revolubly mounted on a rod 20 through the frames 10 is an idler 21 which may have teeth 22 in its periphery and the latter may be and preferably is grooved as shown at 23 in Fig. 4. Mounted on another rod 24 through said frames is what I call a drill wheel 25 whose periphery is also grooved and may also have teeth as seen in Fig. 4. The top of this wheel is spaced slightly beneath the bottom of the idler 21, and the bottom of the drill wheel is slightly below the lower point of the furrow opener 9 as seen in dotted lines in Fig. 1. The purpose of these wheels is, as illustrated in this view, to carry the tape around the idler and thence lay it in the groove of the drill wheel, so that as the latter revolves in the direction of the arrow it will lay it in the furrow made by the opener 9.

The extensions 11 carry coverers 30 which close the furrow after the tape has been laid therein, and in addition the rear wheel 2 may be made quite broad as seen in Fig. 2 so as to smooth out the earth and leave it flat. On a cross strip 31 connecting said extensions 11 is mounted a seed tape cutter 32 having a knob 33 at its upper end sustained by a spring 34, and at any time the operator by pounding on this knob may cause the sharp edge of the cutter to sever the tape, as for instance when he desires to turn corners. On a bracket or rod 35 projecting laterally from the main frame is adjustably mounted a marker as indicated at 36, so that as the machine plants the seed of one row it marks the line where the next succeeding row shall be planted and thus checks the rows in proportion to parts, while of course the spacing of the seeds themselves as they are applied to the tape will accurately check them in the other direction.

With a machine constructed as just described, a spool 15 is mounted within the support formed by the two fingers 12 and the tape 16 is led around the idler and thence around the drill wheel as indicated in Fig. 1. The standard is properly set and the machine carried or wheeled to the point of use, then the rear wheel 2 is let down onto the ground, and the furrow opener 9 enters it to the desired degree for opening up a furrow. As the operator pushes the machine forward, the drill wheel rotates in the direction of the arrow and the tape is drawn from its lower side and laid into the furrow just opened, and the rear wheel 2 rolling it out flat. When the tape on the spool 15 is exhausted, another spool may be taken from one of the pins 19 and substituted, the tape from the new spool being led along the same course. The coverers may be rendered adjustable by slotting their shanks as shown at 39 and connecting them by bolts or set screws with the extensions 11, the depth of the furrow opener 9 may be adjusted by utilizing certain of the holes 6 in the blocks 5 for the passage of the main bolts 7 by means of which these blocks and the shank of the opener are connected with the side bars 3. The marker 36 may be adjusted on the rod 35 to regulate the width of rows, and finally the user is of course not confined to any particular seed or spacing thereof, as the tape used will regulate these features.

The foregoing description and the drawings have reference to what may be considered the preferred, or approved form of my invention. It is to be understood that I may make such changes in construction and arrangement and combination of parts, materials, dimensions, et cetera as may prove expedient and fall within the scope of the appended claims.

Having thus fully described my invention, what I claim as new and desire to secure by Letters Patent, is:—

1. In a seed tape planter, the combination with a wheeled framework, and a furrow opener at the forward portion thereof; of a drill wheel journaled in the framework and traveling in rear of the opener, its periphery being grooved and the bottom of the groove provided with teeth, means for supporting a spool of seed tape on the framework, and a guide in the framework and over which the tape is led on its way to said drill wheel.

2. In a seed tape planter, the combination with a wheeled framework, a furrow opener at the forward portion thereof, and means in rear of the same for closing the furrow; of a drill wheel journaled in the framework and traveling in rear of the opener, its periphery being grooved and the bottom of the groove provided with teeth, means for supporting a spool of seed tape on the framework, and an idler journaled in the framework and over which the tape is led on its way to said drill wheel.

3. In a seed tape planter, the combination with a horizontal framework mounted on wheels, upright standards carried by said framework and having a furrow opener at their lower end and fingers at their upper end constituting a fork, the fingers being notched for the reception of the shaft of a spool of seed tape, and tension springs on the fingers adapted to contact with the head of said spool; of frames carried by said standards, a drill wheel journaled on a shaft through said frames and standing in rear of the opener, an idler journaled on a second shaft through said frames and over which the tape passes on its way to said drill wheel, and means for propelling the machine.

4. In a seed tape planter, the combination with a main frame supported on tandem wheels whereof the rearmost has a broad face, handles on said frame, an upright standard carried by the frame and having a furrow opener at its lower end and a fork at its upper end for the reception of a spool or seed tape, and pins on the frame for the spools; of a drill wheel carried by said frame in rear of the furrow opener, and an idler also carried by said frame and over which the tape passes on its way to the drill wheel.

5. In a seed tape planter, the combination with a main frame mounted on wheels, blocks inside its side bars, two frames next inside said blocks, each having its lower bar extending rearwardly, a standard between the blocks having a furrow opener at its lower end, fingers rising from said blocks, and bars passing transversely through said several elements; of means on the fingers for carrying a spool of seed tape, a shaft through the two frames, a drill wheel mounted thereon in rear of said furrow opener, a second shaft through the frames, an idler mounted thereon above and co-acting with said drill wheel, furrow coverers carried by said extensions, and a tape cutter carried by said extensions in rear of the coverer.

In testimony whereof I affix my signature in presence of two witnesses.

PAUL T. SANFORD.

Witnesses:
ELMER E. McDONALD,
WILLIAM S. RIDGWAY.